(12) United States Patent
Li et al.

(10) Patent No.: US 11,783,594 B2
(45) Date of Patent: Oct. 10, 2023

(54) METHOD OF SEGMENTING PEDESTRIANS IN ROADSIDE IMAGE BY USING CONVOLUTIONAL NETWORK FUSING FEATURES AT DIFFERENT SCALES

(71) Applicant: SOUTHEAST UNIVERSITY, Nanjing (CN)

(72) Inventors: Xu Li, Nanjing (CN); Zhiyong Zheng, Nanjing (CN); Kun Wei, Nanjing (CN)

(73) Assignee: SOUTHEAST UNIVERSITY, Nanjing (CN)

(*) Notice: Subject to any disclaimer, the term of this patent is extended or adjusted under 35 U.S.C. 154(b) by 305 days.

(21) Appl. No.: 17/267,493

(22) PCT Filed: May 16, 2019

(86) PCT No.: PCT/CN2019/087164
§ 371 (c)(1),
(2) Date: Feb. 9, 2021

(87) PCT Pub. No.: WO2020/177217
PCT Pub. Date: Sep. 10, 2020

(65) Prior Publication Data
US 2021/0303911 A1    Sep. 30, 2021

(30) Foreign Application Priority Data

Mar. 4, 2019 (CN) .......................... 201910161808.0

(51) Int. Cl.
*G06V 20/58* (2022.01)
*G06T 7/11* (2017.01)
(Continued)

(52) U.S. Cl.
CPC ............ *G06V 20/58* (2022.01); *G06F 18/253* (2023.01); *G06N 3/045* (2023.01); *G06T 7/11* (2017.01);
(Continued)

(58) Field of Classification Search
CPC .... G06V 20/58; G06V 10/806; G06V 10/454; G06V 40/10; G06V 10/82; G06V 10/765;
(Continued)

(56) References Cited

U.S. PATENT DOCUMENTS 10,468,062 B1 * 11/2019 Levinson ............... G08G 1/166
10,627,823 B1 *  4/2020 Kim ..................... G05D 1/0221
(Continued)

FOREIGN PATENT DOCUMENTS

CN        107688786         2/2018
CN        108520219         9/2018
(Continued)

OTHER PUBLICATIONS

Li. Jianan et al. "Scale-Aware Fast R-CNN for Pedestrian Detection" IEEE Transactions on Multimedia, vol. 20. No. 4. Apr. 30, 2018 (Apr. 30, 2018). pp. 985-996.

*Primary Examiner* — Mia M Thomas
(74) *Attorney, Agent, or Firm* — Treasure IP Group, LLC

(57) ABSTRACT

The present invention discloses a method for segmenting pedestrians in roadside images using a variable-scale multi-feature fusion convolutional network. It addresses the challenge of significant changes in pedestrian scale by using two parallel convolutional neural networks to extract the local and global features at different scales, and then fusing them to obtain a variable-scale multi-feature fusion convolutional neural network, and this network is trained using roadside pedestrian images to realize accurate pedestrian segmentation, avoiding issues with boundary fuzziness and missing segments commonly found in single-network methods.

1 Claim, 2 Drawing Sheets

(51) Int. Cl.
*G06V 20/56* (2022.01)
*G06V 40/10* (2022.01)
*G06F 18/25* (2023.01)
*G06N 3/045* (2023.01)
*G06V 10/764* (2022.01)
*G06V 10/80* (2022.01)
*G06V 10/82* (2022.01)
*G06V 10/44* (2022.01)

(52) U.S. Cl.
CPC .......... *G06V 10/454* (2022.01); *G06V 10/764* (2022.01); *G06V 10/806* (2022.01); *G06V 10/82* (2022.01); *G06V 20/56* (2022.01); *G06V 40/10* (2022.01)

(58) Field of Classification Search
CPC ......... G06V 20/56; G06T 7/11; G06F 18/253; G06N 3/045
See application file for complete search history.

(56) References Cited

U.S. PATENT DOCUMENTS

| | | | |
|---|---|---|---|
| 2015/0217765 A1* | 8/2015 | Tokoro | B60W 50/00 701/1 |
| 2016/0110433 A1* | 4/2016 | Sawhney | G06F 16/9537 707/722 |
| 2017/0190334 A1* | 7/2017 | Zelman | G08G 1/096725 |
| 2018/0336422 A1* | 11/2018 | Kanno | G06T 7/62 |
| 2019/0019045 A1* | 1/2019 | Ogura | G06V 10/44 |
| 2019/0147331 A1* | 5/2019 | Arditi | G06N 20/00 706/20 |
| 2019/0213451 A1* | 7/2019 | Schäfer | G06F 18/285 |

FOREIGN PATENT DOCUMENTS

| | | | | |
|---|---|---|---|---|
| WO | WO-2017158983 A1 * | 9/2017 | ......... | G06K 9/00805 |
| WO | 2018003212 | 1/2018 | | |

* cited by examiner

METHOD OF SEGMENTING PEDESTRIANS IN ROADSIDE IMAGE BY USING CONVOLUTIONAL NETWORK FUSING FEATURES AT DIFFERENT SCALES

CROSS REFERENCE TO RELATED APPLICATION

This application claims priority to a PCT application PCT/CN2019/087164, filed on May 16, 2019, which in turn takes priority of Chinese Application No. 201910161808.0, filed on Mar. 4, 2019. Both the PCT application and Chinese Application are incorporated herein by reference in their entireties.

TECHNICAL FIELD

The present invention belongs to the field of computer vision and intelligent roadside perception technology, and relates to an intelligent roadside terminal image pedestrian segmentation method, in particular to a roadside image pedestrian segmentation method based on a variable-scale multi-feature fusion convolutional network.

BACKGROUND TECHNOLOGY

With the continuous and rapid growth of car ownership, China's road traffic pressure has become prominent. Traffic accidents, especially collisions between cars and pedestrians, have caused serious threats to pedestrians' lives. In order to protect the safety of pedestrians, it is needed to improve the intelligence level of vehicles to make vehicles perceive pedestrians accurately and help drivers drive safely while formulating strict traffic laws and regulations, so as to effectively prevent collision accidents. However, most of intelligent vehicles now only use their own sensors to sense pedestrians, their vision is limited and there are blind spots in their sight distance, so they are insufficiently adaptable to scenes where pedestrians are easily blocked by obstacles, thus having great safety risks. In this context, the development of the intelligent roadside pedestrian perception technology provides new solutions for the pedestrian safety protection. With the wide range role of roadside perception equipment, the perceived pedestrian information is broadcast to nearby vehicles by means of communication to remind drivers to drive carefully to avoid pedestrians.

Taking into account factors such as cost and feasibility, most of the current pedestrian perception methods are based on computer vision. Among them, vision-based pedestrian segmentation has been widely studied as one of important means of pedestrian perception. Most traditional pedestrian segmentation methods based on hand-designed features only consider the situation of a single pedestrian, and use the difference between the individual pedestrian and the background to obtain the segmentation result. However, due to the wide view field of the roadside imaging device and the influence of perspective projection, the pedestrian scale in the obtained image changes significantly, that is, pedestrians at close distances become "large" and pedestrians at long distances become especially "small". At this time, traditional pedestrian segmentation methods can hardly obtain satisfactory results due to their limited feature expression ability.

In recent years, the continuous development of the deep learning technology has provided a new solution for the intelligent roadside terminal image pedestrian segmentation work. Compared to traditional methods, the outstanding advantage of deep learning is its powerful feature expression ability. The pedestrian segmentation method based on the deep neural network has good adaptability to complex traffic scenes and can obtain more accurate segmentation performance. However, the current method of using deep neural networks for pedestrian segmentation mainly uses a single network structure. Based on the network depth alone, it is difficult to accurately extract the boundary local features of large-scale pedestrians and the global features of small-scale pedestrians in the intelligent roadside terminal image, and it is easy to cause boundary fuzziness and even missing segmentation, thus limiting the further improvement of the pedestrian segmentation accuracy and failing to achieve satisfactory results.

SUMMARY OF THE INVENTION

In order to solve the above-mentioned problems, the present invention discloses a roadside image pedestrian segmentation method based on a variable-scale multi-feature fusion convolutional network. The method can effectively solve the problem that most current pedestrian segmentation methods based on a single network structure can hardly apply to variable-scale pedestrians, thus further improving the accuracy and robustness of pedestrian segmentation.

In order to achieve the above objectives, the present invention provides the following technical solutions:

A roadside image pedestrian segmentation method based on a variable-scale multi-feature fusion convolutional network, which includes the following steps:

(1) Establish a pedestrian segmentation dataset.

(2) Construct a variable-scale multi-feature fusion convolutional neural network architecture. First, design two parallel convolutional neural networks to extract the local and global features of pedestrians at different scales in the image. The first network designs a fine feature extraction structure for small-scale pedestrians. The second network expands the receptive field of the network at the shallow level for large-scale pedestrians. Furthermore, the present invention proposes a two-level fusion strategy to fuse the extracted features. First, fuse features of the same level at different scales to obtain local and global features that are suitable for variable-scale pedestrians, and then construct a jump connection structure to fuse the fused local features and global features for the second time so as to obtain the complete local detailed information and global information of variable-scale pedestrians and finally get a variable-scale multi-feature fusion convolutional neural network. This step includes the following sub-steps:

Sub-step 1: Design the first convolutional neural network for small-scale pedestrians, including:

① Design pooling layers. The number of pooling layers is 2. They all use the maximum pooling operation, their sampling sizes are both 2×2, and their step length is both 2;

② Design standard convolutional layers. The number of standard convolutional layers is 18, of which 8 layers all have a convolutional kernel size of 3×3 and the number of their convolutional kernels is 64, 64, 128, 128, 256, 256, 256 and 2, respectively, and their step length is 1; and the remaining 10 layers all have a convolutional kernel size of 1×1, the number of their convolutional kernels are 32, 32, 64, 64, 128, 128, 128, 128, 128 and 128, respectively, and their step length is 1;

③ Design deconvolutional layers. The number of deconvolutional layers is 2, the size of their convolutional kernels is all 3×3 and their step length is all 2, and the number of convolutional kernels is 2 and 2, respectively;

④ Determine the network architecture. Establish different network models according to the network layer parameters involved in ①-③ in sub-step 1 of step (2), and then use the dataset established in step (1) to verify these models, and filter out the optimal network structure in terms of both accuracy and real-timeliness. The optimal network structure is obtained as follows:

Standard convolutional layer 1_1: Use 64 3×3 convolutional kernels and input samples with A×A pixels to make convolutions with a step length of 1, and then activate the convolutions with ReLU to obtain a feature map with a dimension of A×A×64;

Standard convolutional layer 1_1_1: Use 32 1×1 convolutional kernels and the feature map output by standard convolutional layer 1_1 to make convolutions with a step length of 1, and then activate the convolutions with ReLU to obtain a feature map with a dimension of A×A×32;

Standard convolutional layer 1_1_2: Use 32 1×1 convolutional kernels and the feature map output by standard convolutional layer 1_1_1 to make convolutions with a step length of 1, and then activate the convolutions with ReLU to obtain a feature map with a dimension of A×A×32;

Standard convolutional layer 1_2: Use 64 3×3 convolutional kernels and the feature map output by standard convolutional layer 1_1_2 to make convolutions with a step length of 1, and then activate the convolutions with ReLU to obtain a feature map with a dimension of A×A×64;

Pooling layer 1: Use the feature map output by 2×2 verified standard convolutional layer 1_2 to make the maximum pooling with a step length of 2 to get a feature map with a dimension of $$\frac{A}{2} \times \frac{A}{2} \times 64;$$

Standard convolutional layer 2_1: Use 128 3×3 convolutional kernels and the feature map output by pooling layer 1 to make convolutions with a step length of 1, and then activate the convolutions with ReLU to obtain a feature map with a dimension of $$\frac{A}{2} \times \frac{A}{2} \times 128;$$

Standard convolutional layer 2_1_1: Use 64 1×1 convolutional kernels and the feature map output by standard convolutional layer 2_1 to make convolutions with a step length of 1, and then activate the convolutions with ReLU to obtain a feature map with a dimension of $$\frac{A}{2} \times \frac{A}{2} \times 64;$$

Standard convolutional layer 2_1_2: Use 64 1×1 convolutional kernels and the feature map output by standard convolutional layer 2_1_1 to make convolutions with a step length of 1, and then activate the convolutions with ReLU to obtain a feature map with a dimension of $$\frac{A}{2} \times \frac{A}{2} \times 64;$$

Standard convolutional layer 2_2: Use 128 3×3 convolutional kernels and the feature map output by standard convolutional layer 2_1_2 to make convolutions with a step length of 1, and then activate the convolutions with ReLU to obtain a feature map with a dimension of $$\frac{A}{2} \times \frac{A}{2} \times 128;$$

Pooling layer 2: Use the feature map output by 2×2 verified standard convolutional layer 2_2 to make the maximum pooling with a step length of 2 to get a feature map with a dimension of $$\frac{A}{4} \times \frac{A}{4} \times 128;$$

Standard convolutional layer 3_1: Use 256 3×3 convolutional kernels and the feature map output by pooling layer 2 to make convolutions with a step length of 1, and then activate the convolutions with ReLU to obtain a feature map with a dimension of $$\frac{A}{4} \times \frac{A}{4} \times 256;$$

Standard convolutional layer 3_1_1: Use 128 1×1 convolutional kernels and the feature map output by standard convolutional layer 3_1 to make convolutions with a step length of 1, and then activate the convolutions with ReLU to obtain a feature map with a dimension of $$\frac{A}{4} \times \frac{A}{4} \times 128;$$

Standard convolutional layer 3_1_2: Use 128 1×1 convolutional kernels and the feature map output by standard convolutional layer 3_1_1 to make convolutions with a step length of 1, and then activate the convolutions with ReLU to obtain a feature map with a dimension of $$\frac{A}{4} \times \frac{A}{4} \times 128;$$

Standard convolutional layer 3_2: Use 256 3×3 convolutional kernels and the feature map output by standard convolutional layer 3_1_2 to make convolutions with a step length of 1, and then activate the convolutions with ReLU to obtain a feature map with a dimension of $$\frac{A}{4} \times \frac{A}{4} \times 256;$$

Standard convolutional layer 3_2_1: Use 128 1×1 convolutional kernels and the feature map output by standard convolutional layer 3_2 to make convolutions with a step length of 1, and then activate the convolutions with ReLU to obtain a feature map with a dimension of $$\frac{A}{4} \times \frac{A}{4} \times 128;$$

Standard convolutional layer 3_2_2: Use 128 1×1 convolutional kernels and the feature map output by standard convolutional layer 3_2_1 to make convolutions with a step length of 1, and then activate the convolutions with ReLU to obtain a feature map with a dimension of $$\frac{A}{4} \times \frac{A}{4} \times 128;$$

Standard convolutional layer 3_3: Use 256 3×3 convolutional kernels and the feature map output by standard convolutional layer 3_2_2 to make convolutions with a step length of 1, and then activate the convolutions with ReLU to obtain a feature map with a dimension of $$\frac{A}{4} \times \frac{A}{4} \times 256;$$

Standard convolutional layer 3_3_1: Use 128 1×1 convolutional kernels and the feature map output by standard convolutional layer 3_3 to make convolutions with a step length of 1, and then activate the convolutions with ReLU to obtain a feature map with a dimension of $$\frac{A}{4} \times \frac{A}{4} \times 128;$$

Standard convolutional layer 3_3_2: Use 128 1×1 convolutional kernels and the feature map output by standard convolutional layer 3_3_1 to make convolutions with a step length of 1, and then activate the convolutions with ReLU to obtain a feature map with a dimension of $$\frac{A}{4} \times \frac{A}{4} \times 128;$$

Standard convolutional layer 3_4: Use 2 3×3 convolutional kernels and the feature map output by standard convolutional layer 3_3_2 to make convolutions with a step length of 1, and then activate the convolutions with ReLU to obtain a feature map with a dimension of $$\frac{A}{4} \times \frac{A}{4} \times 2;$$

Deconvolutional layer 4: Use 2 3×3 convolutional kernels and the feature map output by the standard convolutional layer 3_4 to make deconvolutions with a step length of 2 to get a feature map with a dimension of $$\frac{A}{2} \times \frac{A}{2} \times 2;$$

Deconvolutional layer 5: Use 2 3×3 convolutional kernels and the feature map output by deconvolutional layer 4 to make deconvolutions with a step length of 2 to get a feature map with a dimension of A×A×2;

Sub-step 2: Design the second convolutional neural network for large-scale pedestrians, including:

① Design pooling layers. The number of pooling layers is 2. They all use the maximum pooling operation, their sampling sizes are both 2×2, and their step length is both 2;

② Design expanded convolutional layers. The number of expanded convolutional layers is 7, their expansion rate is 2, 4, 8, 2, 4, 2 and 4, respectively, and the size of their convolutional kernels is all 3×3, their step length is 1, and the number of their convolutional kernels is 128, 128, 256, 256, 256, 512 and 512, respectively;

③ Design standard convolutional layers. The number of standard convolutional layers is 4, the size of their convolutional kernels is 3×3, their step length is 1, and the number of their convolutional kernel is 64, 64, 512 and 2, respectively;

④ Design deconvolutional layers. The number of deconvolutional layers is 2, the size of their convolutional kernels is both 3×3, their step length is both 2, and the number of their convolutional kernels is 2 and 2, respectively;

⑤ Determine the network architecture. Establish different network models according to the network layer parameters involved in ①~④ in sub-step 2 of step (2), and then use the dataset established in step (1) to verify these models, and filter out the optimal network structure in terms of both accuracy and real-timeliness. The optimal network structure is obtained as follows: Standard convolutional layer 1_1: Use 64 3×3 convolutional kernels and input samples with A×A pixels to make convolutions with a step length of 1, and then activate the convolutions with ReLU to obtain a feature map with a dimension of A×A×64;

Standard convolutional layer 1_2: Use 64 3×3 convolutional kernels and the feature map output by standard convolutional layer 1_1 to make convolutions with a step length of 1, and then activate the convolutions with ReLU to obtain a feature map with a dimension of A×A×64;

Pooling layer 1: Use the feature map output by 2×2 verified standard convolutional layer 1_2 to make the maximum pooling with a step length of 2 to get a feature map with a dimension of $$\frac{A}{2} \times \frac{A}{2} \times 64;$$

Expanded convolutional layer 2_1: Use 128 3×3 convolutional kernels and the feature map output by pooling layer 1 to make convolutions with a step length of 1 and an expansion rate of 2, and then activate the convolutions with ReLU to obtain a feature map with a dimension of $$\frac{A}{2} \times \frac{A}{2} \times 128;$$

Expanded convolutional layer 2_2: Use 128 3×3 convolutional kernels and the feature map output by expanded convolutional layer 2_1 to make convolutions with a step length of 1 and an expansion rate of 4, and then activate the convolutions with ReLU to obtain a feature map with a dimension of $$\frac{A}{2} \times \frac{A}{2} \times 128;$$

Pooling layer 2: Use 2×2 verified feature map output by expanded convolutional layer 2_2 to make the maximum pooling, whose step length is 2, to get a feature map with a dimension of $$\frac{A}{4} \times \frac{A}{4} \times 128;$$

Expanded convolutional layer 3_1: Use 256 3×3 convolutional kernels and the feature map output by pooling layer 2 to make convolutions with a step length of 1 and an expansion rate of 8, and then activate the convolutions with ReLU to obtain a feature map with a dimension of $$\frac{A}{4} \times \frac{A}{4} \times 256;$$

Expanded convolutional layer 3_2: Use 256 3×3 convolutional kernels and the feature map output by expanded convolutional layer 3_1 to make convolutions with a step length of 1 and an expansion rate of 2, and then activate the convolutions with ReLU to obtain a feature map with a dimension of $$\frac{A}{4} \times \frac{A}{4} \times 256;$$

Expanded convolutional layer 3_3: Use 256 3×3 convolutional kernels and the feature map output by expanded convolutional layer 3_2 to make convolutions with a step length of 1 and an expansion rate of 4, and then activate the convolutions with ReLU to obtain a feature map with a dimension of $$\frac{A}{4} \times \frac{A}{4} \times 256;$$

Standard convolutional layer 3_4: Use 512 3×3 convolutional kernels and the feature map output by expanded convolutional layer 3_3 to make convolutions with a step length of 1, and then activate the convolutions with ReLU to obtain a feature map with a dimension of $$\frac{A}{4} \times \frac{A}{4} \times 512;$$

Expanded convolutional layer 3_5: Use 512 3×3 convolutional kernels and the feature map output by the standard convolutional layer 3_4 to make convolutions with a step length of 1 and an expansion rate of 2, and then activate the convolutions with ReLU to obtain a feature map with a dimension of $$\frac{A}{4} \times \frac{A}{4} \times 512;$$

Expanded convolutional layer 3_6: Use 512 3×3 convolutional kernels and the feature map output by expanded convolutional layer 3_5 to make convolutions with a step length of 1 and an expansion rate of 4, and then activate the convolutions with ReLU to obtain a feature map with a dimension of $$\frac{A}{4} \times \frac{A}{4} \times 512;$$

Standard convolutional layer 3_7: Use 2 3×3 convolutional kernels and the feature map output by expanded convolutional layer 3_6 to make convolutions with a step length of 1, and then activate the convolutions with ReLU to obtain a feature map with a dimension of $$\frac{A}{4} \times \frac{A}{4} \times 2;$$

Deconvolutional layer 4: Use 2 3×3 convolutional kernels and the feature map output by the standard convolutional layer 3_7 to make deconvolutions with a step length of 2 to get a feature map with a dimension of $$\frac{A}{2} \times \frac{A}{2} \times 2;$$

Deconvolutional layer 5: Use 2 3×3 convolutional kernels and the feature map output by deconvolutional layer 4 to make deconvolutions with a step length of 2 to get a feature map with a dimension of A×A×2;

Sub-step 3: Propose a two-level fusion strategy to fuse the features extracted by the two networks, including:

① Determine the location of the local and global features of the first convolutional neural network. The local features are located in the 9th convolutional layer from left to right, and the global features are located in the 18th convolutional layer from left to right;

② Determine the location of the local features and global features of the second convolutional neural network. The local features are located in the 5th convolutional layer from left to right, and the global features are located in the 11th convolutional layer from left to right;

③ Fuse the variable-scale features of the two networks at the same level. Fuse the local features extracted by the 9th convolutional layer of the first network with the local features extracted by the 5th convolutional layer of the second network, and then fuse the global features extracted by the 18th convolutional layer of the first network with the global features extracted by the 11th convolutional layer of the second network;

Fuse the local features and global features of the second network, use 1×1 convolution to reduce the dimensions of the variable-scale pedestrian's local features contained in the shallow layer of the second network to the same dimensions as those of the global features in the deep layer, and then construct a jump connection structure to fuse local features with global features, so as to obtain a variable-scale multi-feature fusion convolutional neural network architecture;

(3) Train the designed variable-scale multi-feature fusion convolutional neural network to get network parameters.

(4) Use the variable-scale multi-feature fusion convolutional neural network for pedestrian segmentation.

Compared with existing technologies, the present invention has the following advantages and beneficial effects:

(1) The present invention proposes a pedestrian segmentation method suitable for intelligent roadside terminal images. With the wide perception range of roadside equipment, it realizes the global perception of pedestrians beyond the visual range and overcomes the disadvantage that the dependence of most intelligent vehicles mainly on their own sensors to perform pedestrian perception can easily cause blind spots in the sight distance, thus effectively reducing the missing detection rate of pedestrians;

(2) The present invention designs two parallel convolutional neural networks for pedestrians of different scales to extract the pedestrian features in the intelligent roadside terminal image, and then proposes a two-level fusion strategy to fuse the extracted features. First, obtain the local and global features of the variable-scale pedestrian through the same-level feature fusion, and then perform the secondary fusion of the fused local and global features to obtain a variable-scale multi-feature fusion convolutional neural network. The network not only greatly reduces the impact of pedestrian scale differentiation on segmentation accuracy, but also takes into account the local detailed information and global information of pedestrians at different scales. Compared with most current pedestrian segmentation methods based on a single network structure, it effectively solves problems such as segmentation boundary fuzziness and missing segmentation and improves the accuracy and robustness of pedestrian segmentation.

DETAIL DESCRIPTION OF EMBODIMENTS

The technical solution provided by the present invention will be described in detail below in conjunction with specific embodiments. It should be understood that the following specific embodiments are only used to illustrate the present invention and not to limit the scope of the present invention.

The present invention discloses a roadside image pedestrian segmentation method based on a variable-scale multi-feature fusion convolutional network. This method designs two parallel convolutional neural networks to extract the local and global features of pedestrians at different scales in the image, and then proposes a two-level fusion strategy to fuse the extracted features. First, fuse the same level features of different scales, obtain the local and global features suitable for the variable-scale pedestrian, and then fuse the local features obtained in the previous step with the global feature, so as to obtain complete local detailed information and global information of the variable-scale pedestrian, and finally get the variable-scale multi-feature fusion convolutional neural network. The present invention effectively solves the problem that most current pedestrian segmentation methods based on a single network structure can hardly apply to variable-scale pedestrians, and further improves the accuracy and robustness of pedestrian segmentation.

Specifically, the roadside image pedestrian segmentation method based on a variable-scale multi-feature fusion convolutional network provided by the present invention includes the following steps:

(1) Establish a pedestrian segmentation dataset, label the pedestrian samples obtained by intelligent roadside terminals or use existing data samples, and then adjust the sample size to 227×227 pixels and denote it as $D_k$.

Figure 1:
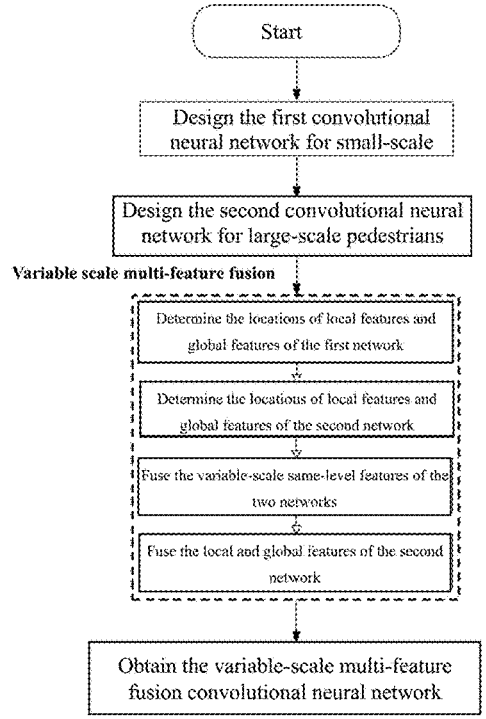
FIG. 1 shows the design flowchart of the present invention's variable-scale multi-feature fusion convolutional neural network.

(2) Design a variable-scale multi-feature fusion convolutional neural network architecture, which consists of two parallel convolutional neural networks. The first network designs a fine feature extraction structure for small-scale pedestrians. The second network expands the receptive field of the network at the shallow level for large-scale pedestrians, and then fuses the local features and global features extracted by the first network with the local features and global features extracted by the second network at the same level, and then constructs a jump connection structure to fuse the fused local features and global features for the second time. The design process is shown in FIG. 1, including the following sub-steps:

Sub-step 1: Design the first convolutional neural network for small-scale pedestrians, including:

① Design the pooling layer. In the convolutional neural network for semantic segmentation, the pooling layer can not only shrink the scale of the feature map to reduce the calculation load, but also expand the receptive field to capture more complete pedestrian information. But frequent pooling operations can easily cause the loss of pedestrian location information, thus hindering the improvement of segmentation accuracy. On the contrary, although the pool-less operation retains as much spatial location information as possible, it increases the computational burden. Therefore, it is needed to consider the impact of the two aspects comprehensively when designing the pooling layer. It is set that the number of pooling layers is $n_{p1}$, having a value range of 2~3; the maximum pooling operation is used, the sampling size is 2×2, and the step size is 2;

② Design the standard convolutional layer. In order to accurately extract the features of small-scale pedestrians in the image, a fine feature extraction structure is designed. This structure is composed of two standard convolutional layers with cascaded convolutional kernels both with a size of 1×1. It can be used to extract the local detailed features of small-scale pedestrians. In addition, in order to give full play to the local perception advantages of the convolutional neural network, the network also uses convolutional kernels with a size of 3×3. Generally speaking, the feature expression ability of the network increases as the number of convolutional layers grows, but the stacking of many convolutional layers increases the calculation load. However, if the number of convolutional layers is small, it will be difficult to extract pedestrian features with strong expressive ability. In view of this, it is set that the number of standard convolutional layers with 1×1 convolutional kernels is $n_{f1}$ having a value range of 2~12; the number of convolutional kernels is $n_b$ (b=1, $n_{f1}$), where $n_b$ is generally valued as an integer power of 2, and the step length is 1. It is set that the number of standard convolutional layers with 3×3 convolutional kernels is $n_{s1}$ having a value range of 5~10, and the number of convolutional kernels is $n_{a1}$ (a1=1, 2, . . . , $n_{s1}$) where $n_{a1}$ is generally valued as an integer power of 2, and the step length is 1;

③ Design the deconvolutional layer. Because $n_{p1}$ times of pooling operation is performed in sub-step 1 of step (2), the feature map is reduced by $1/n_{p1}$ times. In order to restore the feature map to the original image size while avoiding introducing a large amount of noise, $n_{p1}$ deconvolutional layers with learnable parameters are used to decouple the pedestrian features contained in the feature map. Since the pedestrian segmentation task is to make binary classification for each pixel, the number of convolutional kernels in the deconvolutional layer is always 2, all convolutional kernels have a size of 3×3, and the step length is always 2.

④ Determine the network architecture. Establish different network models according to the value range of each variable in sub-step 1 of step (2), and then use the dataset established in step (1) to verify these models, and filter out the optimal network architecture with both accuracy and real-timeliness. Among them, the number of pooling layers is $n_{p1}=2$; the number of standard convolutional layers with 1×1 convolutional kernels is $n_f=10$, and the corresponding number $n_b$ of convolutional kernels are 32, 32, 64, 64, 128, 128, 128, 128, 128 and 128, respectively; the number of standard convolutional layers with 3×3 convolutional kernels is $n_{s1}=8$, and the corresponding number $n_{a1}$ of convolutional kernels are 64, 64, 128, 128, 256, 256, 256 and 2, respectively. The specific structure of the first convolutional neural network is expressed as follows:

Standard convolutional layer 1_1: Use 64 3×3 convolutional kernels and input samples with 227×227 pixels to make convolutions with a step length of 1, and then activate the convolutions with ReLU to obtain a feature map with a dimension of 227×227×64;

Standard convolutional layer 1_1_1: Use 32 1×1 convolutional kernels and the feature map output by standard convolutional layer 1_1 to make convolutions with a step length of 1, and then activate the convolutions with ReLU to obtain a feature map with a dimension of 227×227×32;

Standard convolutional layer 1_1_2: Use 32 1×1 convolutional kernels and the feature map output by standard convolutional layer 1_1_1 to make convolutions with a step length of 1, and then activate the convolutions with ReLU to obtain a feature map with a dimension of 227×227×32;

Standard convolutional layer 1_2: Use 64 3×3 convolutional kernels and the feature map output by standard convolutional layer 1_1_2 to make convolutions with a step length of 1, and then activate the convolutions with ReLU to obtain a feature map with a dimension of 227×227×64;

Pooling layer 1: Use the feature map output by 2×2 verified standard convolutional layer 1_2 to make the maximum pooling with a step length of 2 to get a feature map with a dimension of 113×113×64;

Standard convolutional layer 2_1: Use 128 3×3 convolutional kernels and the feature map output by pooling layer 1 to make convolutions with a step length of 1, and then activate the convolutions with ReLU to obtain a feature map with a dimension of 113×113×128;

Standard convolutional layer 2_1_1: Use 64 1×1 convolutional kernels and the feature map output by standard convolutional layer 2_1 to make convolutions with a step length of 1, and then activate the convolutions with ReLU to obtain a feature map with a dimension of 113×113×64;

Standard convolutional layer 2_1_2: Use 64 1×1 convolutional kernels and the feature map output by standard convolutional layer 2_1_1 to make convolutions with a step length of 1, and then activate the convolutions with ReLU to obtain a feature map with a dimension of 113×113×64;

Standard convolutional layer 2_2: Use 128 3×3 convolutional kernels and the feature map output by standard convolutional layer 2_1_2 to make convolutions with a step length of 1, and then activate the convolutions with ReLU to obtain a feature map with a dimension of 113×113×128;

Pooling layer 2: Use the feature map output by 2×2 verified standard convolutional layer 2_2 to make the maximum pooling with a step length of 2 to get a feature map with a dimension of 56×56×128;

Standard convolutional layer 3_1: Use 256 3×3 convolutional kernels and the feature map output by pooling layer 2 to make convolutions with a step length of 1, and then activate the convolutions with ReLU to obtain a feature map with a dimension of 56×56×256;

Standard convolutional layer 3_1_1: Use 128 1×1 convolutional kernels and the feature map output by standard convolutional layer 3_1 to make convolutions with a step length of 1, and then activate the convolutions with ReLU to obtain a feature map with a dimension of 56×56×128;

Standard convolutional layer 3_1_2: Use 128 1×1 convolutional kernels and the feature map output by standard convolutional layer 3_1_1 to make convolutions with a step length of 1, and then activate the convolutions with ReLU to obtain a feature map with a dimension of 56×56×128;

Standard convolutional layer 3_2: Use 256 3×3 convolutional kernels and the feature map output by standard convolutional layer 3_1_2 to make convolutions with a step length of 1, and then activate the convolutions with ReLU to obtain a feature map with a dimension of 56×56×256;

Standard convolutional layer 3_2_1: Use 128 1×1 convolutional kernels and the feature map output by standard convolutional layer 3_2 to make convolutions with a step length of 1, and then activate the convolutions with ReLU to obtain a feature map with a dimension of 56×56×128;

Standard convolutional layer 3_2_2: Use 128 1×1 convolutional kernels and the feature map output by standard convolutional layer 3_2_1 to make convolutions with a step length of 1, and then activate the convolutions with ReLU to obtain a feature map with a dimension of 56×56×128;

Standard convolutional layer 3_3: Use 256 3×3 convolutional kernels and the feature map output by standard convolutional layer 3_2_2 to make convolutions with a step length of 1, and then activate the convolutions with ReLU to obtain a feature map with a dimension of 56×56×256;

Standard convolutional layer 3_3_1: Use 128 1×1 convolutional kernels and the feature map output by standard convolutional layer 3_3 to make convolutions with a step length of 1, and then activate the convolutions with ReLU to obtain a feature map with a dimension of 56×56×128;

Standard convolutional layer 3_3_2: Use 128 1×1 convolutional kernels and the feature map output by standard convolutional layer 3_3_1 to make convolutions with a step length of 1, and then activate the convolutions with ReLU to obtain a feature map with a dimension of 56×56×128;

Standard convolutional layer 3_4: Use 2 3×3 convolutional kernels and the feature map output by standard convolutional layer 3_3_2 to make convolutions with a step length of 1, and then activate the convolutions with ReLU to obtain a feature map with a dimension of 56×56×2; Deconvolutional layer 4: Use 2 3×3 convolutional kernels and the feature map output by the standard convolutional layer 3_4 to make deconvolutions with a step length of 2 to get a feature map with a dimension of 113×113×2;

Deconvolutional layer 5: Use 2 3×3 convolutional kernels and the feature map output by deconvolutional layer 4 to make deconvolutions with a step length of 2 to get a feature map with a dimension of 227×227×2.

Sub-step 2: Design the second convolutional neural network for large-scale pedestrians, including:

①Design the pooling layer. As known from ⓪ in sub-step 1 step (2), the frequent use of the pooling layer can cause a great loss of pedestrian spatial position information, which can easily cause a decrease in segmentation accuracy. Although making no pooling operation can retain more spatial location information, it can increase the consumption of computing resources. Therefore, it is needed to consider the influence of these two aspects while designing the pooling layer. It is set that the number of pooling layers is $n_{p2}$, having a value range of 2~3, and the maximum pooling operation is used, the sampling size is 2×2, and the step length is 2;

② Design the expanded convolutional layer. Due to the advantage of the expanded convolution that can expand the receptive field without changing the size of the feature map, the expanded convolution can be used to replace standard convolution in the shallow and deep layers of the network to completely capture the boundary features of large-scale pedestrians at the shallow layer and their global features at the deep layer. Although stacking convolutional layers and using a large expansion rate can increase the local receptive field, noise is introduced, and a too large receptive field makes the network ignore the local details of pedestrians, resulting in discontinuous segmentation or even missing segmentation. On the contrary, if the receptive field is too small, it is difficult for the convolutional layer to perceive the pedestrian's global information. Based on the above considerations, it is set that the number of expanded convolutional layers is $n_d$, having a value range of 6-10; the expansion rate is $d_r$ (r=1, 2, . . . , $n_d$), where $d_r$ is an even number and has a value range of 2-10; and the number of convolutional kernels is $n_e$ (e=1, 2, . . . , $n_d$), where $n_e$ is generally valued as an integer power of 2; the size of convolutional kernel is 3×3, and the step size is 1;

③ Design the standard convolutional layer. Generally speaking, the feature expression ability of the network increases as the number of convolutional layers grows, but the stacking of many convolutional layers can increase the computational burden, while too few convolutional layers can make it difficult to extract pedestrian features with strong expressive ability. Considering that the expanded convolutional layer has been designed in ② in sub-step 2 of step (2), set that the number of standard convolutional layers is $n_{s2}$, having a value range of 2~7; the number of convolutional kernels is $n_{a2}$ (a2=1, 2, . . . , $n_{s2}$) where $n_{a2}$ is generally valued as an integer power of 2, the convolutional kernel size is 3×3, and the step size is 1;

④ Design the deconvolutional layer. Because $n_{p2}$ times of pooling operation is performed in ① in sub-step 1 of step (2), the feature map is reduced by $1/n_{p2}$ times. In order to restore the feature map to the original image size while avoiding introducing a large amount of noise, $n_{p2}$ deconvolutional layers with learnable parameters are used to decouple the pedestrian features contained in the feature map. The number of convolutional kernels in the deconvolutional layer is always 2, all convolutional kernels have a size of 3×3, and the step length is always 2.

⑤ Determine the network architecture. Establish different network models according to the value range of each variable in sub-step 2 of step (2), and then use the dataset established in step (1) to verify these models, and filter out the optimal network architecture with both accuracy and real-timeliness. Among them, the number of pooling layers is $n_{p2}$=2; the number of expanded convolutional layers is $n_d$=7, the expansion rate $d_r$ is 2, 4, 8, 2, 4, 2 and 4, respectively, and the corresponding number $n_e$ of convolutional kernels is 128, 128, 256, 256, 256, 512 and 512, respectively; the number of standard convolutional layers is $n_{s2}$=4, and the corresponding number $n_{a2}$ of convolutional kernels is 64, 64, 512 and 2, respectively. The specific structure of the second convolutional neural network is expressed as follows:

Standard convolutional layer 1_1: Use 64 3×3 convolutional kernels and input samples with 227×227 pixels to make convolutions with a step length of 1, and then activate the convolutions with ReLU to obtain a feature map with a dimension of 227×227×64;

Standard convolutional layer 1_2: Use 64 3×3 convolutional kernels and the feature map output by standard convolutional layer 1_1 to make convolutions with a step length of 1, and then activate the convolutions with ReLU to obtain a feature map with a dimension of 227×227×64;

Pooling layer 1: Use the feature map output by 2×2 verified standard convolutional layer 1_2 to make the maximum pooling with a step length of 2 to get a feature map with a dimension of 113×113×64;

Expanded convolutional layer 2_1: Use 128 3×3 convolutional kernels and the feature map output by pooling layer 1 to make convolutions with a step length of 1 and an expansion rate of 2, and then activate the convolutions with ReLU to obtain a feature map with a dimension of 113×113×128;

Expanded convolutional layer 2_2: Use 128 3×3 convolutional kernels and the feature map output by expanded convolutional layer 2_1 to make convolutions with a step length of 1 and an expansion rate of 4, and then activate the convolutions with ReLU to obtain a feature map with a dimension of 113×113×128;

Pooling layer 2: Use 2×2 verified feature map output by expanded convolutional layer 2_2 to make the maximum pooling, whose step length is 2, to get a feature map with a dimension of 56×56×128;

Expanded convolutional layer 3_1: Use 256 3×3 convolutional kernels and the feature map output by pooling layer 2 to make convolutions with a step length of 1 and an expansion rate of 8, and then activate the convolutions with ReLU to obtain a feature map with a dimension of 56×56×256;

Expanded convolutional layer 3_2: Use 256 3×3 convolutional kernels and the feature map output by expanded convolutional layer 3_1 to make convolutions with a step length of 1 and an expansion rate of 2, and then activate the convolutions with ReLU to obtain a feature map with a dimension of 56×56×256;

Expanded convolutional layer 3_3: Use 256 3×3 convolutional kernels and the feature map output by expanded convolutional layer 3_2 to make convolutions with a step length of 1 and an expansion rate of 4, and then activate the convolutions with ReLU to obtain a feature map with a dimension of 56×56×256;

Standard convolutional layer 3_4: Use 512 3×3 convolutional kernels and the feature map output by expanded convolutional layer 3_3 to make convolutions with a step length of 1, and then activate the convolutions with ReLU to obtain a feature map with a dimension of 56×56×512;

Expanded convolutional layer 3_5: Use 512 3×3 convolutional kernels and the feature map output by the standard convolutional layer 3_4 to make convolutions with a step length of 1 and an expansion rate of 2, and then activate the convolutions with ReLU to obtain a feature map with a dimension of 56×56×512;

Expanded convolutional layer 3_6: Use 512 3×3 convolutional kernels and the feature map output by expanded convolutional layer 3_5 to make convolutions with a step length of 1 and an expansion rate of 4, and then activate the convolutions with ReLU to obtain a feature map with a dimension of 56×56×512;

Standard convolutional layer 3_7: Use 2 3×3 convolutional kernels and the feature map output by expanded convolutional layer 3_6 to make convolutions with a step length of 1, and then activate the convolutions with ReLU to obtain a feature map with a dimension of 56×56×2;

Deconvolutional layer 4: Use 2 3×3 convolutional kernels and the feature map output by the standard convolutional layer 3_7 to make deconvolutions with a step length of 2 to get a feature map with a dimension of 113×113×2;

Deconvolutional layer 5: Use 2 3×3 convolutional kernels and the feature map output by deconvolutional layer 4 to make deconvolutions with a step length of 2 to get a feature map with a dimension of 227×227×2.

Figure 2:
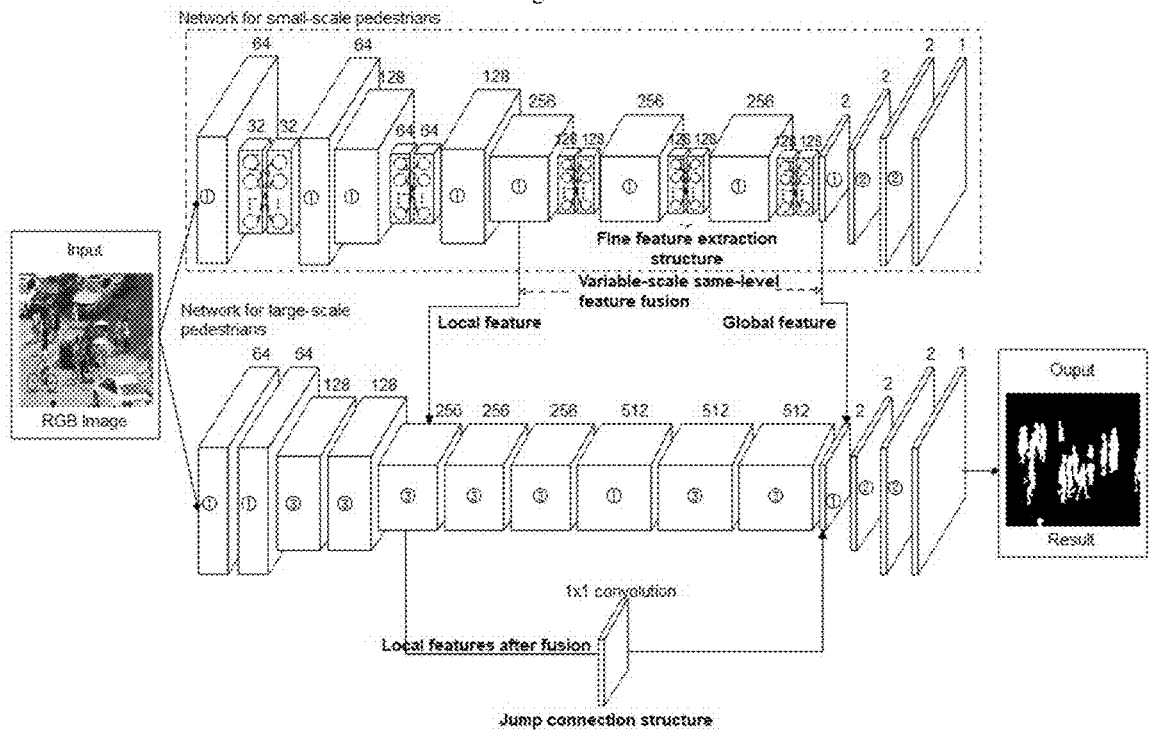
FIG. 2 shows the schematic diagram of the variable-scale multi-feature fusion convolutional neural network structure designed by the present invention.

Sub-step 3: Propose a two-level fusion strategy to fuse the features extracted by the two networks, including:

① Determine the location of the local and global features of the first convolutional neural network. According to the characteristics of deep learning to extract features hierarchically, that is, local features are generally located in the shallow layer of the network and global features are generally located in the deep layer, initially determine the location of the local features, that is, which convolutional layer the local features are located, denoted as $s_{l1}$, having a value range of 6~10, and then determine the specific value of $s_{l1}$ by means of feature visualization. Generally, the features extracted by the last standard convolutional layer are used as global features to obtain the more sufficient global information of the pedestrian, that is, the global features are located in the 18th convolutional layer from left to right;

② Determine the location of the local features and global features of the second convolutional neural network, and determine the location of the local features and global features according to the method described in ① in sub-step 3 of step (2), where the location of the local features is denoted as $s_{l2}$, having a value range of 3~6, and the global features are located in the 11th convolutional layer from left to right;

③ Fuse the variable-scale features of the two networks at the same level. Within the value ranges of $s_{l1}$ and $s_{l2}$ get the value of $s_{l1}$ as 9 and the value of $s_{l2}$ as 5 through the feature visualization method. Fuse the local features extracted by the 9th convolutional layer of the first network with the local features extracted by the 5th convolutional layer of the second network, and then fuse the global features extracted by the 18th convolutional layer of the first network with the global features extracted by the 11th convolutional layer of the second network;

④ Fuse the local and global features of the second network. In order to reduce the number of additional network parameters introduced during feature fusion, a convolution with a convolutional kernel size of 1×1 is used to reduce the dimension of the local features of the variable-scale pedestrian contained in the shallow layer of the second network to make the local features have the same dimension as the global features in the deep layer, and then a jump connection structure is constructed to fuse the local features with the global features, so as to get a variable-scale multi-feature fusion convolutional neural network architecture, as shown in FIG. 2.

(3) Train the designed variable-scale multi-feature fusion convolutional neural network, and iterate and optimize the network parameters through the stochastic gradient descent method. The training process includes two stages: forward propagation and back propagation. In the forward propagation stage, the sample set (x, y) is input into the network, where x is the input image and y is the corresponding label. The actual output f(x) is obtained through the computation of the network layer by layer, and the cross-entropy cost function with L2 regularization term is used to measure the error between the ideal output y and the actual output f(x):

$$J(\theta) = -\frac{1}{M}\left[\sum_{i=1}^{M}\sum_{j=1}^{N}\sum_{q=1}^{Q} 1\{y_i^j = q\} \cdot \log p_q(x_i^j)\right] + \frac{\lambda}{2M}\theta^T \cdot \theta \quad (1)$$

In formula (1), the first term is the cross-entropy cost function, the second term is the L2 regularization term used to prevent overfitting. θ represents the parameters to be learned by the convolutional neural network model, M represents the number of training samples, N represents the number of pixels in each image, and Q represents the number of semantic categories in the samples; for road segmentation, Q=2, and 1{y=q} is an indicator function, which is set to 1 in case of y=q and 0 in other cases; λ is the regularization coefficient, $x_i^j$ represents the gray value of the j th pixel in the i th sample, $y_i^h$ represents the label corresponding to $x_i^j$ and $p_g(x_i^j)$ represents the probability that $x_i^j$ belongs to the q th category and is defined as:

$$p_q(x_i^j) = \frac{e^{f_q(x_i^j)}}{\sum_{q=1}^{Q} e^{f_q(x_i^j)}} \quad (2)$$

In formula (2), $f_q(x_i^j)$ represents the output of the q th feature map of the last anti-convolutional layer at $x_i^j$ and is defined as:

$$f_q(x_i^j) = \theta_q^T \cdot x_i^j \quad 3)$$

In the back propagation stage, the network parameters are updated layer by layer from back to front through the stochastic gradient descent algorithm to minimize the error between the actual output and the ideal output. The parameter update formula is as follows:

$$\theta \leftarrow \left(1 - \alpha\frac{\lambda}{M}\right)\theta - \alpha\nabla_\theta J_0(\theta) \quad (4)$$

In formula (4), a is the learning rate, $J_0(\theta)$ is the cross-entropy cost function, and $\Delta_\theta J_0(\theta)$ is the calculated gradient.

Figure 3:
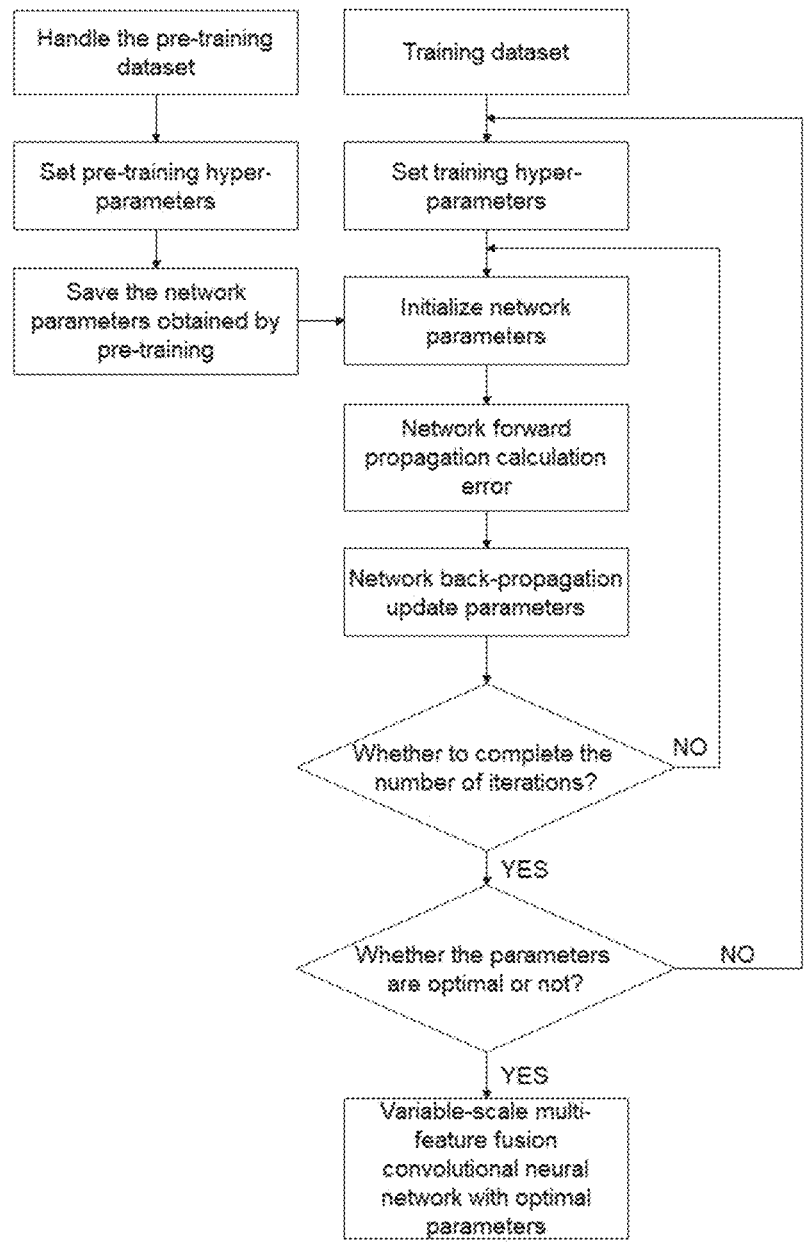
FIG. 3 shows the training flowchart of the variable-scale multi-feature fusion convolutional neural network designed by the present invention.

After selecting the cost function, regularization method and optimization algorithm, use the deep learning framework to train the designed convolutional neural network. In order to make the training results more accurate, perform pre-training before the formal training, and then fine-tune the parameters obtained by the pre-training. The training process is shown in FIG. 3, which specifically includes the following sub-steps:

Sub-step 1: Select the dataset related to autonomous driving, such as ApolloScape, Cityscapes and CamVid, and handle it to make it include only the pedestrian category, and then adjust the sample size to 227×227 pixels and denote it as $D_c$. Then, use $D_c$ to pre-train the two designed convolutional neural networks and set the pre-training hyper-parameters, respectively, where the maximum number of iterations is $I_{c1}$ and $I_{c2}$, the learning rate is $\alpha_{c1}$ and $\alpha_{c2}$, and the weight attenuation is $\lambda_{c1}$ and $\lambda_{c2}$, respectively, and finally save the network parameters obtained by the pre-training;

Sub-step 2: Use the dataset $D_k$ established in step (1) to fine-tune the parameters of the two networks obtained by the pre-training in sub-step 1 of step (3), and set the maximum number of iterations to $I_{k1}$ and $I_{k2}$, the learning rate to $\alpha_{k1}$ and $\alpha_{k2}$, and the weight attenuation to $\lambda_{k1}$ and $\lambda_{k2}$, respectively, and then obtain two convolutional neural network models with optimal network parameters according to the changes in the training loss curve and the verification loss curve;

Sub-step 3: Use the dataset $D_k$ established in step (1) to train the variable-scale multi-feature fusion convolutional neural network obtained in sub-step 3 of step (2), and reset the maximum number of iterations to $I_{k3}$, the learning rate to $\alpha_{k3}$ and the weight attenuation to $\lambda_{k3}$, and then get the variable-scale multi-feature fusion convolutional neural network model with the optimal parameters according to the changes in the training loss curve and the verification loss curve, that is, at the critical point where the training loss curve slowly decreases and tends to converge while the verification loss curve is rising.

(4) Use the variable-scale multi-feature fusion convolutional neural network for pedestrian segmentation, adjust the size of the pedestrian sample obtained by the intelligent roadside terminal to 227×227 pixels and input it into the trained variable-scale multi-feature fusion convolutional neural network, so as to get the pedestrian segmentation result.

The invention claimed is:

1. A roadside image pedestrian segmentation method based on a variable-scale multi-feature fusion convolutional network, comprising
    (1) establishing a pedestrian segmentation dataset; and
    (2) constructing a variable-scale multi-feature fusion convolutional neural network comprising the steps of
        firstly designing two parallel convolutional neural networks to extract the local and global features of pedestrians at different scales in the image; wherein
            a first network designs a fine feature extraction structure for small-scale pedestrians;
            a second network expands the receptive field of the network at the shallow level for large-scale pedestrians;
        secondly providing a two-level fusion strategy to fuse extracted features by the following steps
            first, fusing features of same level at different scales to obtain local and global features that are suitable for variable-scale pedestrians, and
            then constructing a jump connection structure to the fused local features and global features for the second time so as to obtain the complete local detailed information and global information of variable-scale pedestrians, and
            finally obtaining a variable-scale multi-feature fusion convolutional neural network which includes the following sub-steps:
        Sub-step 1: designing the first convolutional neural network for small-scale pedestrians, including:
            ① designing pooling layers wherein a number of pooling layers is 2;
            the pooling layers use a maximum pooling operation, their sampling sizes are both 2×2, and their step length is both 2;
            ② designing standard convolutional layers such that a number of standard convolutional layers is 18, of which 8 layers all have a convolutional kernel size of 3×3 and a number of the convolutional kernels is 64, 64, 128, 128, 256, 256, 256 and 2, respectively, and the step length is 1; and the remaining 10 layers all have a convolutional kernel size of 1×1, the number of their convolutional kernels are 32, 32, 64, 64, 128, 128, 128, 128, 128 and 128, respectively, and their step length is 1;
            ③ designing deconvolutional layers; such that a number of deconvolutional layers is 2, the size of their convolutional kernels is all 3×3 and their step length is all 2, and the numbers of convolutional kernels are 2 and 2, respectively;
            ④ determining the network architecture in order to establish different network models according to the network layer parameters involved in ①~③ in sub-step 1 of step (2), and then use the dataset established in step (1) to verify these models, and filtering out the optimal network structure in terms of both accuracy and real-timeliness an optimal network structure is obtained as follows:

Standard convolutional layer 1_1: using 64 3×3 convolutional kernels and input samples with A×A pixels to make convolutions with a step length of 1, and then activating the convolutions with ReLU to obtain a feature map with a dimension of A×A×64;

Standard convolutional layer 1_1_1: using 32 1×1 convolutional kernels and the feature map output by standard convolutional layer 1_1 to make convolutions with a step length of 1, and then activating the convolutions with ReLU to obtain a feature map with a dimension of A×A×32;

Standard convolutional layer 1_1_2: using 32 1×1 convolutional kernels and the feature map output by standard convolutional layer 1_1_1 to make convolutions with a step length of 1, and then activating the convolutions with ReLU to obtain a feature map with a dimension of A×A×32;

Standard convolutional layer 1_2: using 64 3×3 convolutional kernels and the feature map output by standard convolutional layer 1_1_2 to make convolutions with a step length of 1, and then activating the convolutions with ReLU to obtain a feature map with a dimension of A×A×64;

Pooling layer 1: using the feature map output by 2×2 verified standard convolutional layer 1_2 to make the maximum pooling with a step length of 2 to get a feature map with a dimension of $$\frac{A}{2} \times \frac{A}{2} \times 64;$$

Standard convolutional layer 2_1: using 128 3×3 convolutional kernels and the feature map output by pooling layer 1 to make convolutions with a step length of 1, and then activating the convolutions with ReLU to obtain a feature map with a dimension of $$\frac{A}{2} \times \frac{A}{2} \times 128;$$

Standard convolutional layer 2_1_1: using 64 1×1 convolutional kernels and the feature map output by standard convolutional layer 2_1 to make convolutions with a step length of 1, and then activating the convolutions with ReLU to obtain a feature map with a dimension of $$\frac{A}{2} \times \frac{A}{2} \times 64;$$

Standard convolutional layer 2_1_2: using 64 1×1 convolutional kernels and the feature map output by standard convolutional layer 2_1_1 to make convolutions with a step length of 1, and then activating the convolutions with ReLU to obtain a feature map with a dimension of $$\frac{A}{2} \times \frac{A}{2} \times 64;$$

Standard convolutional layer 2_2: using 128 3×3 convolutional kernels and the feature map output by standard convolutional layer 2_1_2 to make convolutions with a step length of 1, and then activating the convolutions with ReLU to obtain a feature map with a dimension of $$\frac{A}{2} \times \frac{A}{2} \times 128;$$

Pooling layer 2: using the feature map output by 2×2 verified standard convolutional layer 2_2 to make the maximum pooling with a step length of 2 to get a feature map with a dimension of $$\frac{A}{4} \times \frac{A}{4} \times 128;$$

Standard convolutional layer 3_1: using 256 3×3 convolutional kernels and the feature map output by pooling layer 2 to make convolutions with a step length of 1, and then activating the convolutions with ReLU to obtain a feature map with a dimension of $$\frac{A}{4} \times \frac{A}{4} \times 256;$$

Standard convolutional layer 3_1_1: using 128 1×1 convolutional kernels and the feature map output by standard convolutional layer 3_1 to make convolutions with a step length of 1, and then activating the convolutions with ReLU to obtain a feature map with a dimension of $$\frac{A}{4} \times \frac{A}{4} \times 128;$$

Standard convolutional layer 3_1_2: using 128 1×1 convolutional kernels and the feature map output by standard convolutional layer 3_1_1 to make convolutions with a step length of 1, and then activating the convolutions with ReLU to obtain a feature map with a dimension of $$\frac{A}{4} \times \frac{A}{4} \times 128;$$

Standard convolutional layer 3_2: using 256 3×3 convolutional kernels and the feature map output by standard convolutional layer 3_1_2 to make convolutions with a step length of 1, and then activating the convolutions with ReLU to obtain a feature map with a dimension of $$\frac{A}{4} \times \frac{A}{4} \times 256;$$

Standard convolutional layer 3_2_1: using 128 1×1 convolutional kernels and the feature map output by standard convolutional layer 3_2 to make convolutions with a step length of 1, and then activating the convolutions with ReLU to obtain a feature map with a dimension of $$\frac{A}{4} \times \frac{A}{4} \times 128;$$

Standard convolutional layer 3_2_2: using 128 1×1 convolutional kernels and the feature map output by standard convolutional layer 3_2_1 to make convolutions with a step length of 1, and then activating the convolutions with ReLU to obtain a feature map with a dimension of $$\frac{A}{4} \times \frac{A}{4} \times 128;$$

Standard convolutional layer 3_3: using 256 3×3 convolutional kernels and the feature map output by standard convolutional layer 3_2_2 to make convolutions with a step length of 1, and then activating the convolutions with ReLU to obtain a feature map with a dimension of $$\frac{A}{4} \times \frac{A}{4} \times 256;$$

Standard convolutional layer 3_3_1: using 128 1×1 convolutional kernels and the feature map output by standard convolutional layer 3_3 to make convolutions with a step length of 1, and then activating the convolutions with ReLU to obtain a feature map with a dimension of $$\frac{A}{4} \times \frac{A}{4} \times 128;$$

Standard convolutional layer 3_3_2: using 128 1×1 convolutional kernels and the feature map output by standard convolutional layer 3_3_1 to make convolutions with a step length of 1, and then activating the convolutions with ReLU to obtain a feature map with a dimension of $$\frac{A}{4} \times \frac{A}{4} \times 128;$$

Standard convolutional layer 3_4: using 2 3×3 convolutional kernels and the feature map output by standard convolutional layer 3_3_2 to make convolutions with a step length of 1, and then activating the convolutions with ReLU to obtain a feature map with a dimension of $$\frac{A}{4} \times \frac{A}{4} \times 2;$$

Deconvolutional layer 4: using 2 3×3 convolutional kernels and the feature map output by the standard convolutional layer 3_4 to make deconvolutions with a step length of 2 to get a feature map with a dimension of $$\frac{A}{2} \times \frac{A}{2} \times 2;$$

Deconvolutional layer 5: using 2 3×3 convolutional kernels and the feature map output by deconvolutional layer 4 to make deconvolutions with a step length of 2 to get a feature map with a dimension of A×A×2;
Sub-step 2: designing the second convolutional neural network for large-scale pedestrians, including:
① designing pooling layers a number of pooling layers is 2, they all use a maximum pooling operation, their sampling sizes are both 2×2, and their step length is both 2;
② designing expanded convolutional layers, a number of expanded convolutional layers is 7, their expansion rate is 2, 4, 8, 2, 4, 2 and 4, respectively, and sizes of their convolutional kernels is all 3×3, their step length is 1, and a number of their convolutional kernels is 128, 128, 256, 256, 256, 512 and 512, respectively;
③ designing standard convolutional layers a number of standard convolutional layers is 4, the size of their convolutional kernels is 3×3, their step length is 1, and a number of their convolutional kernel is 64, 64, 512 and 2, respectively;
④ designing deconvolutional layers a number of deconvolutional layers is 2, size of their convolutional kernels is both 3×3, their step length is both 2, and the number of their convolutional kernels is 2 and 2, respectively;
⑤ determining the network architecture, establishing different network models according to the network layer parameters involved in ①~④ in sub-step 2 of step (2), and then using the dataset established in step (1) to verify these models, and filtering out the optimal network structure in terms of both accuracy and real-timeliness an optimal network structure is obtained as follows:
Standard convolutional layer 1_1: using 64 3×3 convolutional kernels and input samples with A×A pixels to make convolutions with a step length of 1, and then activate the convolutions with ReLU to obtain a feature map with a dimension of A×A×64;
Standard convolutional layer 1_2: using 64 3×3 convolutional kernels and the feature map output by standard convolutional layer 1_1 to make convolutions with a step length of 1, and then activate the convolutions with ReLU to obtain a feature map with a dimension of A×A×64;
Pooling layer 1: using the feature map output by 2×2 verified standard convolutional layer 1_2 to make the maximum pooling with a step length of 2 to get a feature map with a dimension of $$\frac{A}{2} \times \frac{A}{2} \times 64;$$

Expanded convolutional layer 2_1: using 128 3×3 convolutional kernels and the feature map output by pooling layer 1 to make convolutions with a step length of 1 and an expansion rate of 2, and then activate the convolutions with ReLU to obtain a feature map with a dimension of $$\frac{A}{2} \times \frac{A}{2} \times 128;$$

Expanded convolutional layer 2_2: using 128 3×3 convolutional kernels and the feature map output by expanded convolutional layer 2_1 to make convolutions with a step length of 1 and an expansion rate of 4, and then activate the convolutions with ReLU to obtain a feature map with a dimension of $$\frac{A}{2} \times \frac{A}{2} \times 128;$$

Pooling layer 2: using 2×2 verified feature map output by expanded convolutional layer 2_2 to make the maximum pooling, whose step length is 2, to get a feature map with a dimension of $$\frac{A}{4} \times \frac{A}{4} \times 128;$$

Expanded convolutional layer 3_1: using 256 3×3 convolutional kernels and the feature map output by pooling layer 2 to make convolutions with a step length of 1 and an expansion rate of 8, and then activate the convolutions with ReLU to obtain a feature map with a dimension of $$\frac{A}{4} \times \frac{A}{4} \times 256;$$

Expanded convolutional layer 3_2: using 256 3×3 convolutional kernels and the feature map output by expanded convolutional layer 3_1 to make convolutions with a step length of 1 and an expansion rate of 2, and then activate the convolutions with ReLU to obtain a feature map with a dimension of $$\frac{A}{4} \times \frac{A}{4} \times 256;$$

Expanded convolutional layer 3_3: using 256 3×3 convolutional kernels and the feature map output by expanded convolutional layer 3_2 to make convolutions with a step length of 1 and an expansion rate of 4, and then activate the convolutions with ReLU to obtain a feature map with a dimension of $$\frac{A}{4} \times \frac{A}{4} \times 256;$$

Standard convolutional layer 3_4: using 512 3×3 convolutional kernels and the feature map output by expanded convolutional layer 3_3 to make convolutions with a step length of 1, and then activate the convolutions with ReLU to obtain a feature map with a dimension of $$\frac{A}{4} \times \frac{A}{4} \times 512;$$

Expanded convolutional layer 3_5: using 512 3×3 convolutional kernels and the feature map output by the standard convolutional layer 3_4 to make convolutions with a step length of 1 and an expansion rate of 2, and then activate the convolutions with ReLU to obtain a feature map with a dimension of $$\frac{A}{4} \times \frac{A}{4} \times 512;$$

Expanded convolutional layer 3_6: using 512 3×3 convolutional kernels and the feature map output by expanded convolutional layer 3_5 to make convolutions with a step length of 1 and an expansion rate of 4, and then activate the convolutions with ReLU to obtain a feature map with a dimension of $$\frac{A}{4} \times \frac{A}{4} \times 512;$$

Standard convolutional layer 3_7: using 2 3×3 convolutional kernels and the feature map output by expanded convolutional layer 3_6 to make convolutions with a step length of 1, and then activate the convolutions with ReLU to obtain a feature map with a dimension of $$\frac{A}{4} \times \frac{A}{4} \times 2;$$

Deconvolutional layer 4: using 2 3×3 convolutional kernels and the feature map output by the standard convolutional layer 3_7 to make deconvolutions with a step length of 2 to get a feature map with a dimension of $$\frac{A}{2} \times \frac{A}{2} \times 2;$$

Deconvolutional layer 5: using 2 3×3 convolutional kernels and the feature map output by deconvolutional layer 4 to make deconvolutions with a step length of 2 to get a feature map with a dimension of A×A×2;

Sub-step 3: proposing a two-level fusion strategy to fuse the features extracted by the two networks, including:

① determining the location of the local and global features of the first convolutional neural network local features are located in the 9th convolutional layer from left to right, and the global features are located in the 18th convolutional layer from left to right;

② determining the location of the local features and global features of the second convolutional neural network, the local features are located in the 5th convolutional layer from left to right, and the global features are located in the 11th convolutional layer from left to right;

③ fusing the variable-scale features of the two networks at the same level, fusing the local features extracted by the 9th convolutional layer of the first network with the local features extracted by the 5th convolutional layer of the second network, and then fusing the global features extracted by the 18th convolutional layer of the first network with the global features extracted by the 11th convolutional layer of the second network;

④ fusing the local and global features of the second network, using a 1×1 convolution to reduce the dimension of the local features of the variable-scale pedestrian contained in the shallow layer of the second network to make the local features have the same dimension as the global features in the deep layer, and then constructing a jump connection structure to fuse the local features with the global features, so as to get a variable-scale multi-feature fusion convolutional neural network architecture;

(3) training the designed variable-scale multi-feature fusion convolutional neural network to get network parameters;

(4) using the variable-scale multi-feature fusion convolutional neural network for pedestrian segmentation.

\* \* \* \* \*